(12) United States Patent
Castle

(10) Patent No.: US 11,603,007 B1
(45) Date of Patent: Mar. 14, 2023

(54) ELECTRICALLY POWERED MODULAR PLATFORMS

(71) Applicant: Cora Castle, Wilmington, DE (US)

(72) Inventor: Cora Castle, Wilmington, DE (US)

( * ) Notice: Subject to any disclaimer, the term of this patent is extended or adjusted under 35 U.S.C. 154(b) by 0 days.

(21) Appl. No.: 17/163,154

(22) Filed: Jan. 29, 2021

Related U.S. Application Data

(60) Provisional application No. 62/968,882, filed on Jan. 31, 2020.

(51) Int. Cl.
| | | |
|---|---|---|
| *B60L 53/51* | (2019.01) | |
| *H02J 7/00* | (2006.01) | |
| *H05B 47/175* | (2020.01) | |
| *H02S 40/32* | (2014.01) | |
| *H02S 40/38* | (2014.01) | |
| *B60L 53/66* | (2019.01) | |
| *B60L 3/04* | (2006.01) | |
| *B60L 53/53* | (2019.01) | |
| *B64F 1/36* | (2017.01) | |
| *B60L 53/12* | (2019.01) | |
| *G06Q 20/14* | (2012.01) | |

(52) U.S. Cl.
CPC .................. *B60L 53/51* (2019.02); *B60L 3/04* (2013.01); *B60L 53/12* (2019.02); *B60L 53/53* (2019.02); *B60L 53/665* (2019.02); *B64F 1/364* (2013.01); *G06Q 20/14* (2013.01); *H02J 7/0047* (2013.01); *H02S 40/32* (2014.12); *H02S 40/38* (2014.12); *H05B 47/175* (2020.01); *B60L 2200/10* (2013.01)

(58) Field of Classification Search
CPC .......... B60L 53/51; B60L 53/665; B60L 3/04; B60L 2200/10; B02S 40/32; H02S 40/38; H05B 47/175; B64F 1/364; G06Q 20/14; H02J 7/0047
See application file for complete search history.

(56) References Cited

U.S. PATENT DOCUMENTS

| | | | | |
|---|---|---|---|---|
| 6,081,205 | A * | 6/2000 | Williams | ................ B60L 53/14 340/932.2 |
| 8,487,584 | B2 * | 7/2013 | Taylor-Haw | ............ B60L 53/16 320/109 |
| 2010/0127430 | A1 * | 5/2010 | Singh | ...................... B29C 33/58 425/90 |
| 2012/0020349 | A1 * | 1/2012 | Dunwoody | ............ G06F 15/161 709/250 |
| 2015/0035437 | A1 * | 2/2015 | Panopoulos | ............ F21S 8/085 315/291 |

* cited by examiner

*Primary Examiner* — Jared Fureman
*Assistant Examiner* — Duc M Pham
(74) *Attorney, Agent, or Firm* — Fish & Richardson P.C.

(57) ABSTRACT

This specification describes an electrically powered modular platform comprising a power module comprising a common power bus, the power module electrically connected to a power source; one or more service modules that provide a service; a termination module that is configured to cover an opening in the one or more service modules, wherein the power module, each of the one or more service modules, and the termination module are modular and stackable, and wherein the power module and each of the one or more service modules are electrically connected using the common power bus to provide power to each of the one or more service modules.

20 Claims, 13 Drawing Sheets

ELECTRICALLY POWERED MODULAR PLATFORMS

CROSS-REFERENCE TO RELATED APPLICATION

This application claims the benefit of the filing date of U.S. Provisional Application No. 62/968,882, filed on Jan. 31, 2020. The contents of U.S. Provisional Application No. 62/968,882 are incorporated herein by reference in their entirety.

TECHNICAL FIELD

This disclosure relates to devices with interchangeable service modules.

BACKGROUND

Many services that need to be used by the general public are impractical due to the cost of purchase or ownership, difficulty to obtain and/or require large amounts of private space on their property. For instance, not everyone has feasible internet access, a secure way to receive public delivery of a package, space in their home for an air compressor, or the means to install electrical vehicle (EV) charging capabilities where they live or work. In particular, those with "on street parking" or who live in apartments can be most affected by many of these shortfalls. Additionally, many conceivable public services are not currently available due to lack of a suitable powered public infrastructure.

SUMMARY

This disclosure relates to a new class of device featuring customizable, electricity-enabled, subscription-based services to the public through the use of a unique method of combining interchangeable service modules into a shared or private device and scalable, expandable electrical infrastructure into a publicly situated device.

A shared or private powered public service device is described that enables the general public to access certain electrical services that they may otherwise not have access to. Services related to internet, WiFi, vehicle maintenance/repair, public safety, parking metering, vehicle/device charging, secure tepid/refrigerated/heated parcel delivery, waste disposal/compaction, durable good sharing/rental, weather monitoring, municipal lighting, atmospheric water condensation, cellular service repeating or even local power storage/generation could easily be realized on a platform that can be installed virtually anywhere. This device could be powered from the local power grid, or in some configurations can generate its own power, such as using solar panels, wind turbines or gas generator. Additionally the platform shall be controlled remotely via the internet via wifi, cellular internet or satellite internet. A user can gain access and interact with the provided services via mobile apps. Such a platform would allow a user to see the location of all nearby platforms, available services, and reserve or plan device utilization.

For example, if a user desired to charge an electric vehicle that was low on charge, they could select and reserve a device which provided that service ahead of time. The contractual capability between users and the platform, enables the platform to track utilization and charge money for services rendered. For instance, a town or municipality could afford to purchase and install a number of these platforms by recouping their investment through user's renting access.

Many conceivable advantages could be realized by residential users of such a device including but not limited to: charging handheld devices during a power outage, residents near a device can charge their EV or put air in a tire, access shared internet through their device in their homes, or have a parcel delivered without fear that someone will steal it from their porch or stoop. Advantages to municipalities from such a device could include (but are not limited to): monitoring or metering parking utilization, repeating wireless services or ensuring public safety. A powered public solution available to all community members and the municipality resolve all of the previously described issues as well as an array of public services previously unavailable or unfeasible to many communities. On top of this, usage data can be used to access which services are most used aiding in the development of future services. Notably, the services provided on any particular device is customizable based on the needs of the local municipality and residents.

Some powered public service platforms include three types of primary component modules: a power module, services module(s), and a termination module.

A platform can include a power module disposed at the base of the platform. The power module can provide power from a power source to a power bus disposed within the power module. In some example, the power module houses all necessary power conditioning, power distribution and device control equipment such as necessary for remote internet connectivity. The platform can also include one or more service modules disposed in the platform and electrically connected to the power bus by an electrical connection. The platform can also include a network device configured to provide a network connection between the platform and a remote server. Each of the one or more service modules can be vertically stackable above each other, and the bottommost one of the one or more service modules can be disposed directly above the power module. Each of the one or more service modules can be enabled by receiving a payment.

In some implementations, the payment can be received by a subscription service and the payment can be waived if approved according to instructions from the remote server.

In some implementations, the network device can be configured to provide data usage information to the remote server and network device can be configured to receive reservation information from the remote server.

In some implementations, at least one of the one or more service modules is reservable and each of the one or more service modules can be disposed using a rack system.

In some implementations, each of the one or more service modules can be configured to provide a service relating to electric device charging systems, pneumatic systems, internet access systems, lighting systems, sanitary systems, storage systems, public safety systems, water condensation systems, weather monitoring systems, goods sharing systems, cellular service systems, power storage systems, parcel delivery systems, public vending systems, or power generation systems.

In some implementations, one of the one or more service modules can be an electric vehicle charging module configured to provide electrical charging service to an electric vehicle.

In some implementations, one of the one or more service modules can provide between 120V and 250V electrical service at between 10 A and 50 A.

In some implementations, the platform can include an electricity meter and/or an electrical kill switch.

In some implementations, the platform can include a termination module that is configured to cover an opening on the top of the platform.

In some implementation, the power module can be configured to generate and store electrical power and can include an electrical power panel with at least six circuits.

In some implementations, the power module provides 120V and 220V service to the one or more service modules.

In some implementations, at least one of the one or more service modules can be a pneumatic air compressor module configured to inflate devices, a lighting module configured to provide lighting to an area surrounding the platform, or an aerial drone charging station configured to inductively charge aerial drones.

In some implementations, the platform is configured to be mounted and installed on a vehicle and operable while the vehicle is in motion.

In some implementations, the platform can be affixed to the ground with one or more earth anchors or stakes or affixed in a cement mounting.

In some implementations, the power source can be a photovoltaic cell, a battery, or a power grid.

In some implementations, the platform is between 1 and 12 feet wide per side.

In some implementations, the power bus is configured to provide more than two service modules to be connected at any given time.

The details of one or more implementations of these systems and methods are set forth in the accompanying drawings and the description below. Other features, objects, and advantages of these systems and methods will be apparent from the description and drawings, and from the claims.

DESCRIPTION OF FIGURES

Like reference symbols in the various drawings indicate like elements.

DETAILED DESCRIPTION

Figure 1:
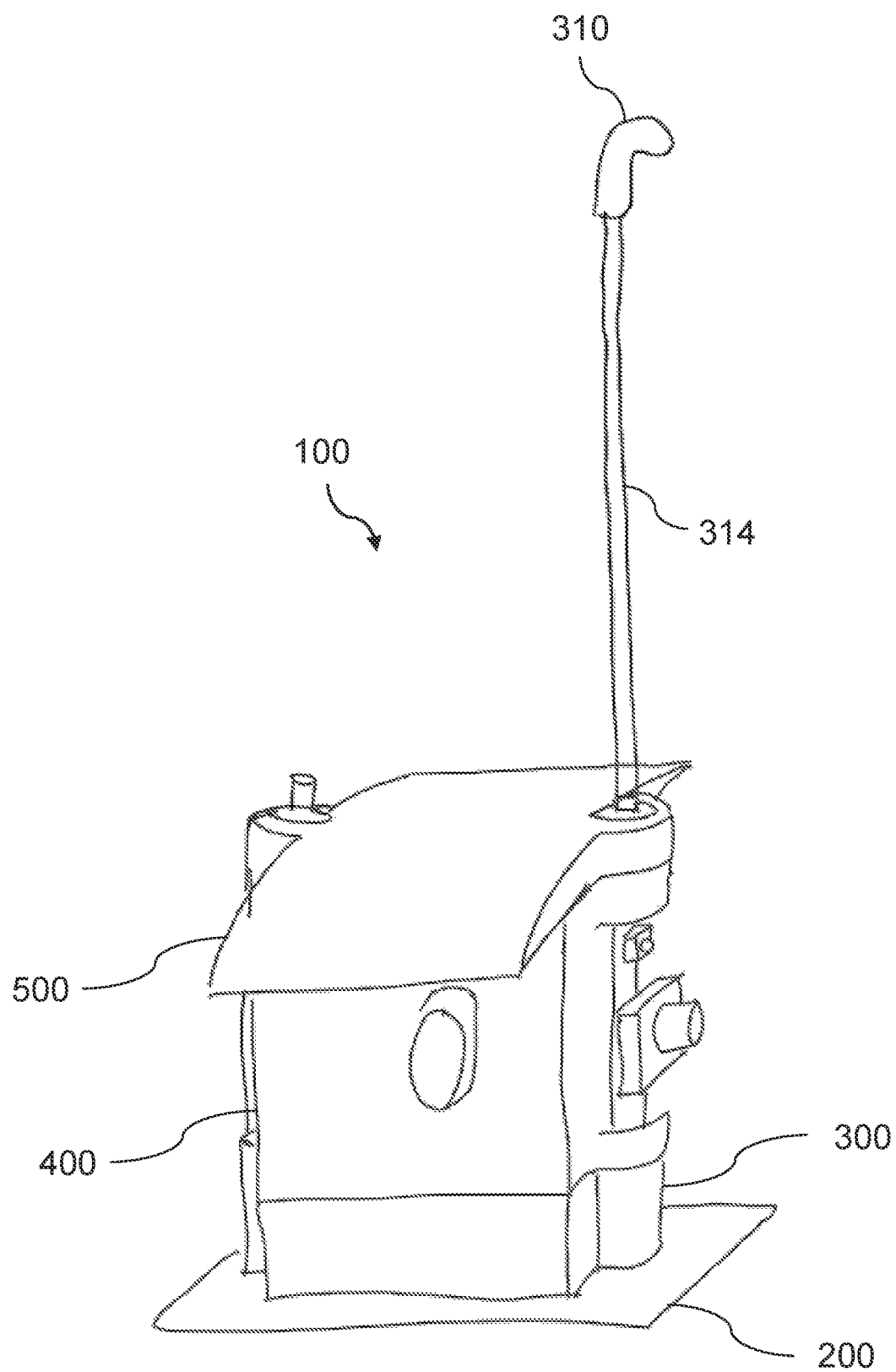
FIG. 1 illustrates a powered public services platform.

This disclosure describes systems and techniques for a new class of electrical devices. Referring to FIG. 1, a powered public services platform 100 can include three classes of primary component modules: a power module 300, a service module 400, and a termination module 500. Each of these modules have a role in the functionality of the platform 100. The platform 100 employs a modular design and can be installed almost any location with any configuration of various service modules described elsewhere in this document.

Preferably, platform 100 can be moved and installed with relative ease in a permanent, semi-permanent or temporary deployment. A mounting plate 200 provides a foundation upon which the remainder of the platform 100 is constructed. The mounting plate 200 can be part of a power module 300 that provides the necessary power for the platform 100. FIG. 1 shows the platform 100 in an unmounted configuration, where the mounting plate 200 on the underneath of the platform 100 is not affixed to any structure. Mounting plate 200 can be various sizes, but typically a square size with an edge dimension of 30 inches is used. This mounting option relies at least in part on the inherent weight of the platform to prevent it from moving or being moved. Other mounting configuration will be described with reference to other implementations later.

Figure 2:
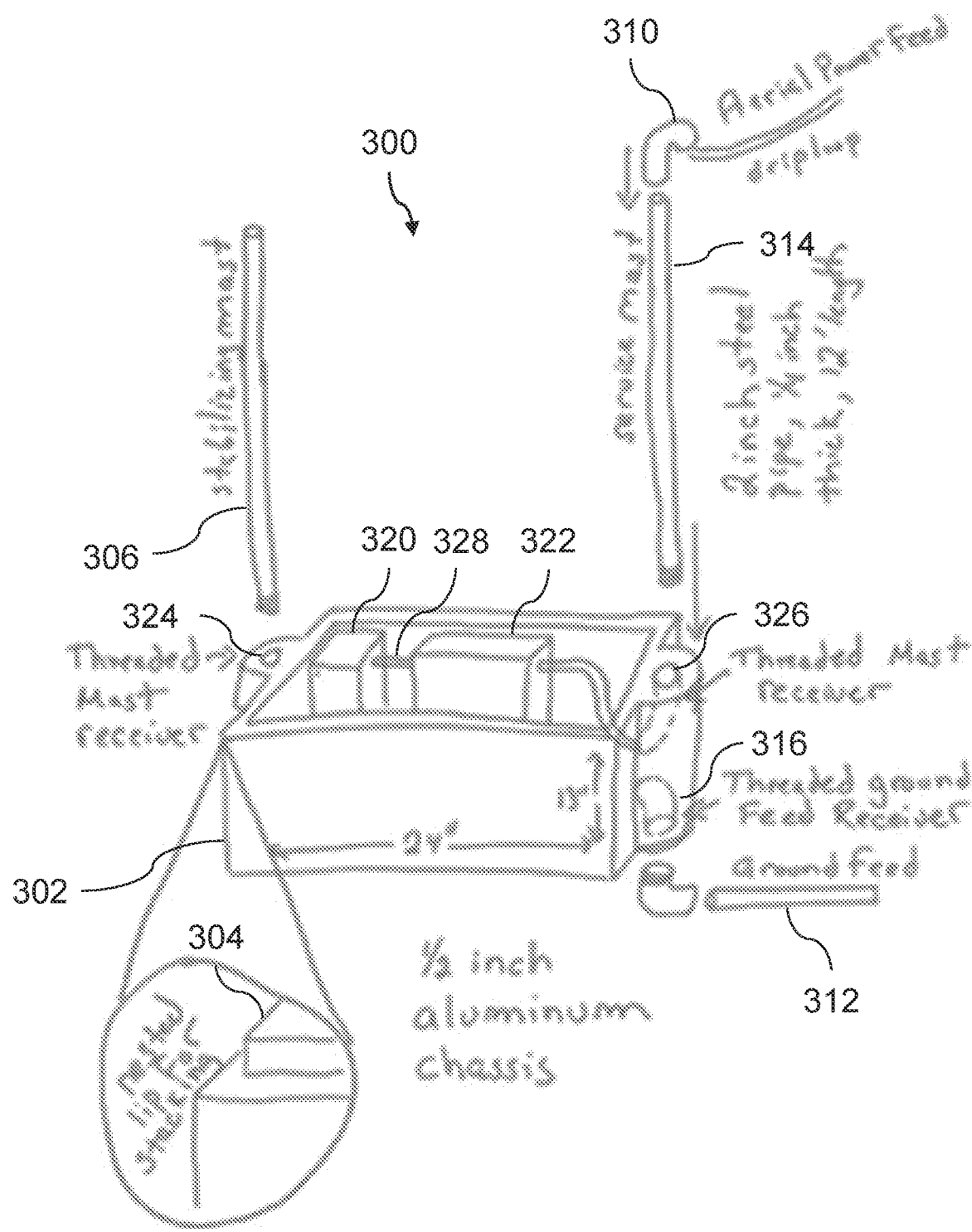
FIG. 2 illustrates a power module that accommodates aerial and ground power feeds.

Referring now to FIG. 2, the power module 300 can be used to accept, house, condition, and distribute AC power for powered services to be used by the platform 100 or any attached service module. Independent of the source of the power, the power module 300 houses the necessary safety (e.g., power interruption) equipment. Platform 100 has fittings which enable it to be self-metered in order to accommodate power directly from power provider. Platform 100 complies with NEC requirements for public power delivery.

Power can be received by the power module 300 in various ways, such as using aerial power delivery 310, ground power delivery 312, or power can be generated locally. If aerial power delivery 310 is used, an aerial service mast 314 can be used to receive a power line from a nearby utility pole or other structure. If ground power delivery 312 is used, an underground receiver 316 can be used to accept power delivery from an underground power line. In some cases power may be generated by a component within the platform 100 or generated by another nearby power source. For example, solar panels or a wind turbine can be used to generate electricity. In some cases, a generator can be used to provide power in remote areas.

Figure 3:
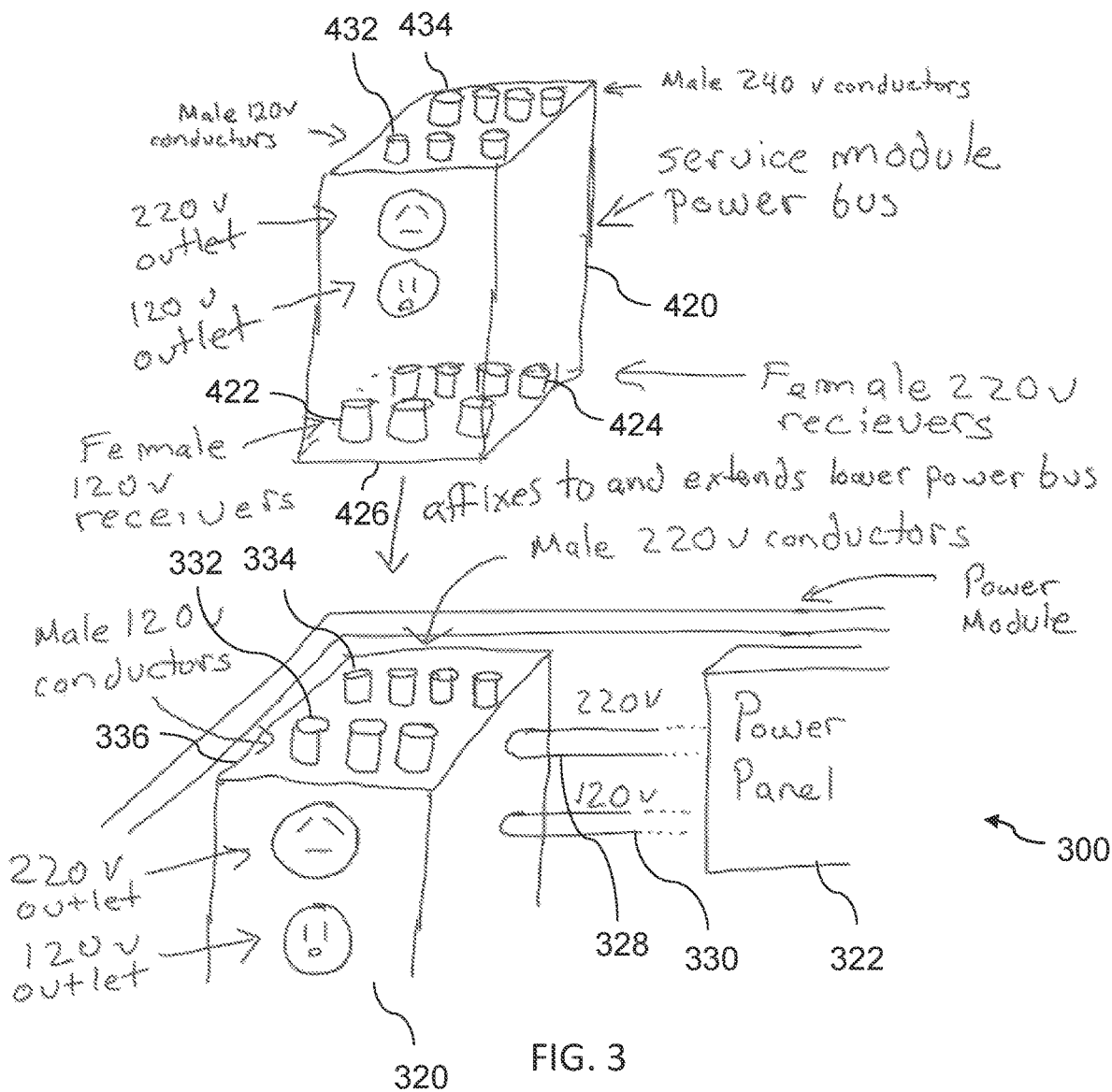
FIG. 3 illustrates electrical details of the power module of FIG. 2.

A power panel 322 (or circuit breaker) is used to divide the electrical power into individual circuits and can preferably include a minimum of 6 spaces. Typically, the power panel 322 will use at least three of these spaces. Two can be used for 220V or 240V service and one for 120V service. Referring to FIG. 3, a 220V service line 328 connects the power panel 322 to a power bus 320 and a 120V service line 330 connects the power panel 322 to the power bus 320. The power bus 320 is intended to distribute power to the included service modules 400 and components within the platform 100. The power bus 320 is a stackable modular power extender through the use of mating pairs of male and female conductors. Geometry of the top surface 336 of the power bus 320 connects with the bottom geometry or surface 426 of the stacked (upper) service power bus 420 creating an extended, energized power bus assembly through each attached service module the service module which allows it be used to distribute power to any of the devices within the service module and throughout the platform 100. In other words, the top of the service module power bus 420 is substantially similar to the power module power bus 320 creating the stackable power bus system to distribute power throughout the platform 100. The top and bottom surfaces of the power bus system can also include mating features to allow them to engage and form a robust mechanical connection. Such mating features can be a recessed lip, latches, adhesives, or mechanical fasteners.

Three 120V male conductors 332 can be arranged in a row of the power bus 320 and form a protrusion that engages with a row of receptacles of female 120V conductors from the above mounted service module. In the case of platform 100, three female 120V conductors 422 connect to the three 120V male conductors 332. A contacting diameter of the male conductors can be slightly larger than the female conductors enabling a slight press-fit to ensure a reliable electrical connection. Additionally or alternatively, the male protrusions can include spring-like detents and/or malleable features so that a reliable electrical connection is ensured and that separation of the electrical connection requires them to be pulled apart with force.

The power module 300 includes components necessary for NEC compliance relating to power meter placement and usage as well as power panel placement and usage, as well as remote monitoring and maintenance such as integrated cellular modem, cameras, temperature sensors, computing hardware, power arresters and other standard or bespoke diagnostic and communications equipment. The power module 300 uses standard fittings for ease of integration with any combination of base or service options. Electrical power can be distributed within the power module 300 using a 120V outlet and 220V outlet on the power bus 320.

Figure 5:
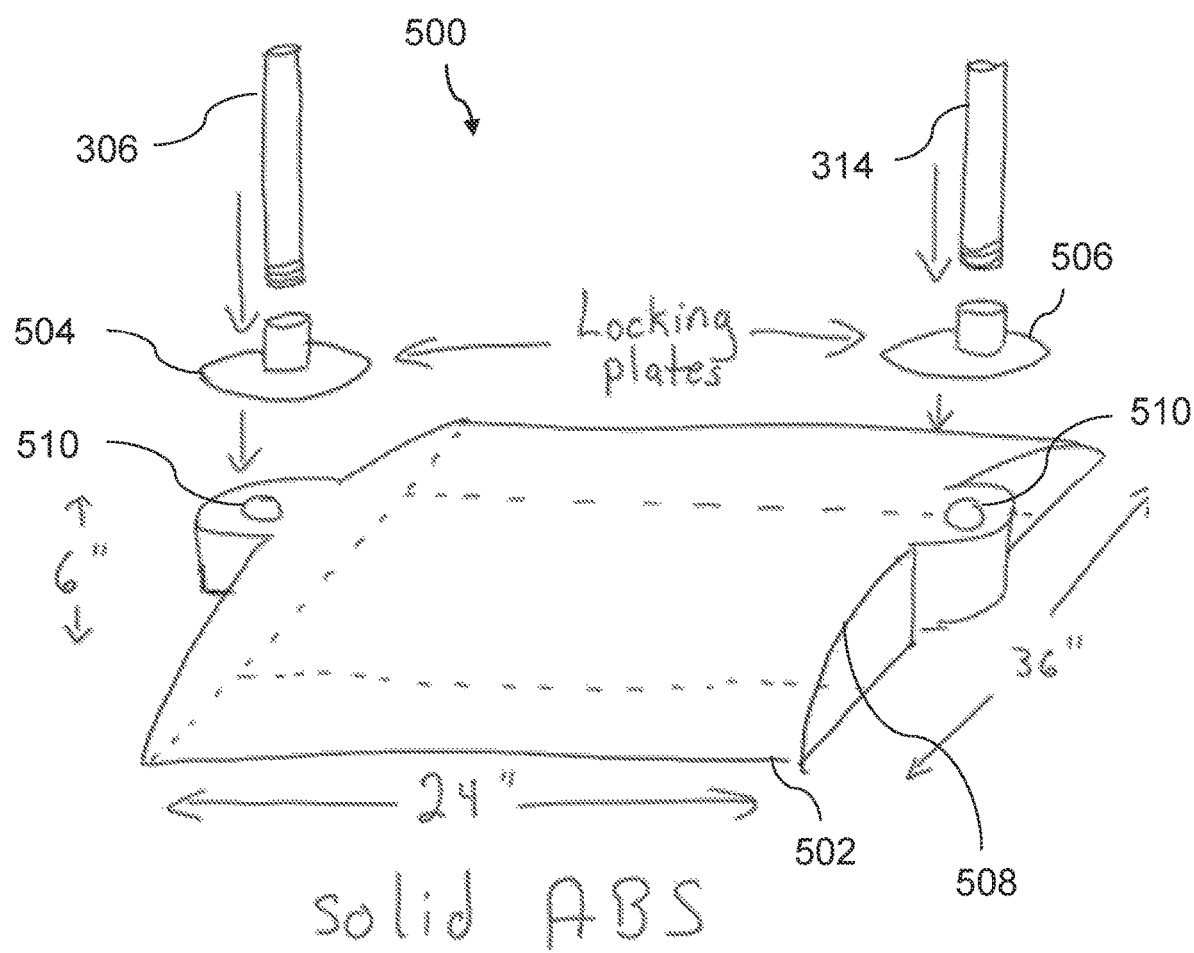
FIG. 5 illustrates a termination module.

In some implementations the device includes the means to deliver electrical service through an aerial service mast 314. The service mast 314 can be a 2 inch diameter steel pipe that has a wall thickness of about 0.25 inches. The service mast 314 can be as long as necessary to satisfy local electrical codes (typically 12 feet). In some cases a tensioning wire may be necessary to stabilize the service mast. Stabilizing mast 306 can also be used to affix and secure the structure of platform 100 and can be a 2 inch diameter steel pipe that has a wall thickness of about 0.25 inches with a length sufficient to crest the top of platform 100 with enough length to affix the locking plates 504 (as seen in FIG. 5). The stabilizing mast 306 can be substantially similar to the service mast 314. Stabilizing mast 306 and service mast 314 can also provide structural support and secure all the modules together (best seen in FIG. 1).

During assembly, the stabilizing mast 306 and service mast 314 will install from above, passing through the termination module 500 (best seen in FIG. 1), all service modules (such as EV charging service module 400) and screw into threaded receivers 324 and 326 in power module 300, respectively.

The power module 300 includes a housing 302 that supports the electrical components as well as functionality apart from the service modules. The housing 302 serves as the base of the platform 100 allowing other modules to be affixed atop the power module 300 via a stacking lip 304 (also referred to as a nested or recessed lip). The stacking lip 304 enables multiple modules to be stacked vertically. The stacking lip 304 includes a recessed surface around the periphery of the housing 302 so that it engages with a compatible recess in other housings. Once the housings have engaged, horizontal movement of the housings relative to each other is prevented.

Typically, the housing 302 is made of aluminum and has a wall thickness of about 0.5 inches, but other thickness can be used. The housing 302 is a corner-rounded square with a length of 24 inches on each side. Typically the height is about 13 inches. However, these dimensions can vary depending on the contents and arrangement of the electronics within the housing 302.

The next component is the combination of select service modules desired by local users. Platform 100 shown in FIG. 1 integrates only a level 2 EV charging service module 400, but a single platform 100 may make use of one or more service modules. If more than one service module is selected for a given platform, they will combine seamlessly, using a stacking or nesting lip (substantially similar to the stacking lip 304) to create a single multi-purpose platform. Depending on the service(s) included, different people may use included services at the same or different times. Other service modules will be discussed with reference to other implementations later.

Figure 4:
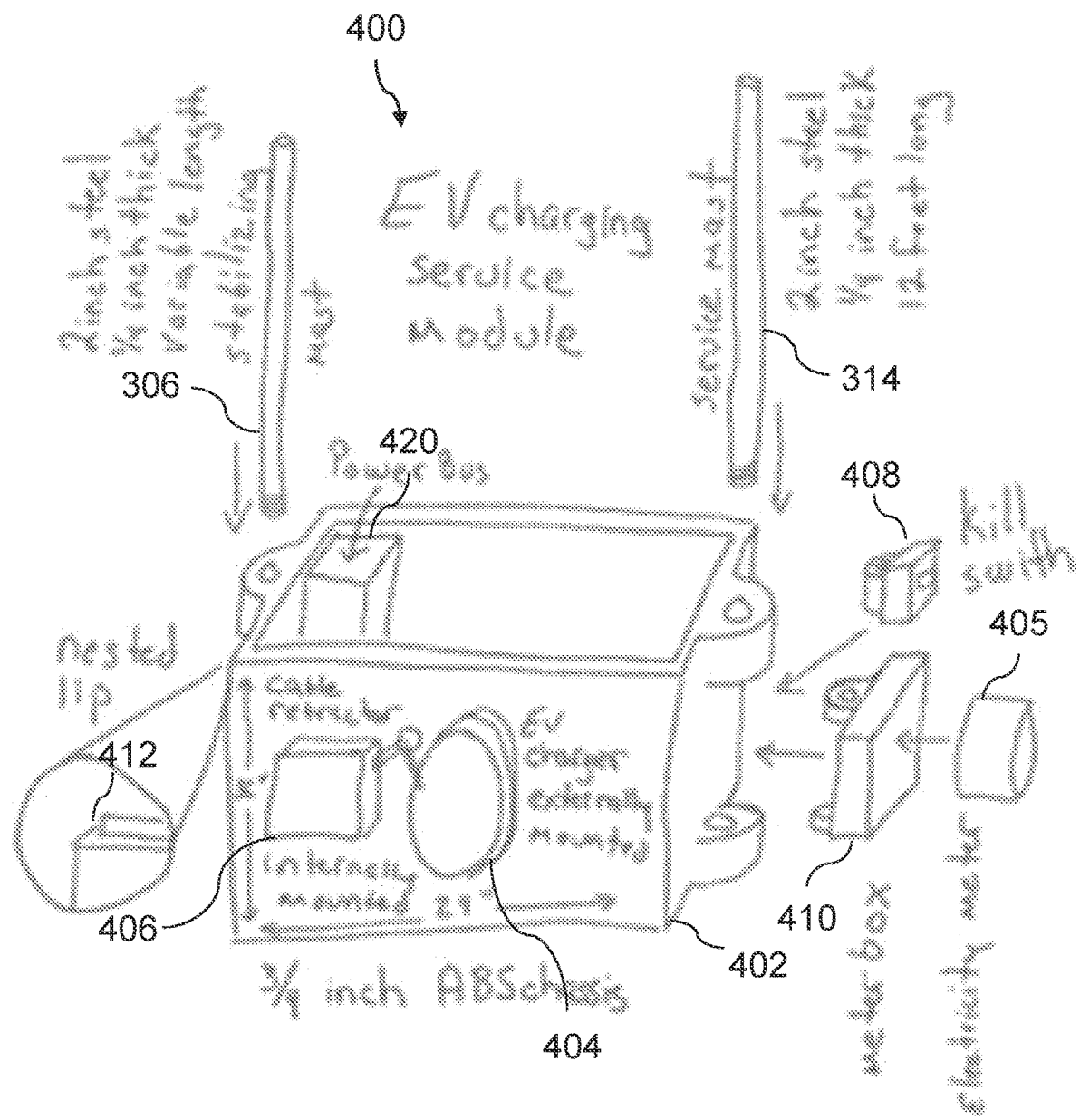
FIG. 4 illustrates a level 2 EV charging service module.

The level 2 EV charging service module 400 is described with reference to FIG. 4. The level 2 EV charging service module 400 provides a "level 2" charging capability utilizing 220 V which permits faster than a "level 1" charger. Typical commercially available level 2 EV charging equipment uses 220V, 40 A service. However, various voltage and current chargers can be used.

In similarity to the previously described power module 300, the level 2 EV charging service module 400 can use various types of fittings for ease of integration with any combination of mounting, power and service options. As previously described, the level 2 EV charging service module 400 includes a power bus 420 that is part of the common power bus system established by the power module 300. Electrical power can be distributed within the level 2 EV charging module 400 using a 120V outlet and 220V outlet on the power bus 420 (as seen in FIG. 3).

The level 2 EV charging service module 400 includes a level 2 EV charger 404 mounted on the exterior of the housing 402. The level 2 EV charger 404 includes a charging cable that be attached to an electric vehicle parked nearby. In some implementations, the level 2 EV charger 404 features an internally mounted cable retractor 406 that retracts the charging cable when not in use. However the cable retractor 406 can be provided on the exterior of the housing 402, or omitted altogether. Similar charging modules can integrate wired or wireless electric vehicle charging for automobiles, motorcycles, bicycles, scooters, Segways, wheelchairs, or skateboards. Essentially anything that includes a rechargeable battery is within the scope of a similarly constructed charging module 400. For household items, one or more standard electric outlets can be provided on the housing 402.

Some implementations of platform 100 include an integrated power meter 405 and/or a breaker power panel to meet code and commercial power requirements. Such equipment may be mounted on service module 400 or power module 100. This is further described with reference to FIG. 12 below.

The electricity meter 405 is installed using a meter box 410 that attaches in line with the service mast 314. A kill switch 408 can also be included to provide an emergency electricity cutoff. The kill switch 408 and the meter box 410 and electricity meter 410 are shown on the level 2 EV charging service module 400, but these features can be included on any module of the platform 100 since they can be mounted to the service mast 314.

The housing 402 of the level 2 EV charging service module 400 includes a stacking lip 412 that engages with a compatible recessed lip on upper and lower modules as previously described. The housing 402 can be made of thermoplastics such as ABS plastic or recycled plastic to make it lightweight, but it could also be made of any material, including metals. The size of the housing 402 can vary, but the typical size is about 24 inches square by about 36 inches in height. The height of the service module depends on the included features and preferably enables features to be used at a reasonable or necessary height off of the ground.

Referring now to FIG. 5, the termination module 500 exists to ensure that the platform is properly protected from environmental factors such as rain, snow, other forms of moisture or precipitation as well as extreme heat or dust and ultraviolet radiation. The termination module 500 can be affixed to the top of the uppermost service module and serve as the "top" of the platform. In the case of platform 100, the termination module 500 sits above the level 2 EV charging service module 400.

The termination module 500 includes a solid ABS plastic cap 502 that ensures that the underneath modules are not exposed to precipitation or other environmental hazards. The cap 502 is shown to be 24 inches in width and but 36 inches in depth. This allows the cap 502 to overhang the underneath modules keeping rain and other elements away from the module. The top of the cap 502 can have a curve arc profile 508 that allows rain and the elements to fall off the cap 502 rather than pool or otherwise collect on top.

The termination module 500 includes two locking plates 504 and 506 that affix to the stabilizing mast 306 and the service mast 314, respectively. The threaded service and stability masts pass through openings 510 in the termination module 500 and similar openings in the service modules (such as the level 2 EV charging module 400) and screw into threaded receivers 324 and 326 in the power module 300 as previously described. The locking plates 504 and 506 are locked into place thus tightly fastening all modules together and ensuring that the modules cannot be lifted, separated, or removed without the proper means to unlock the locking plates 504 and 506. For example, a disassembly tool can be required to unlock the locking plates 504 and 506, thus preventing users from tampering with the platform 100.

Platform 100 is shown with the preferable termination module 500, but other termination modules can be used as necessary. For example, in some installations access to the space above the platform 100 is required so a more compact or minimal cap can be used. For instance, while platform 100 includes a termination cap 500 with a curved arc profile 508, other profiles such as triangular or sloped profiles can be used and flat profiles can certainly be used. Flat profiles may be most useful for interior installations. In particular, for an interior installation, a termination option or cap is largely cosmetic. This is largely because these platforms would not be exposed to even light environmental effects. A light-duty termination option exists for geographical areas where passive protection against environmental effects will ensure safe continued operation. A heavy-duty termination option exists for locations requiring active environmental protection against extreme dust, heat or cold or solar radiation. Active protection can include air conditioning equipment, dust filters, heaters, radiation shielding, or dehumidification. Thus, a service termination can have provisions that allow air to enter and exit the platform, such as a fan port or vents. Such airflow can be helpful to cool electronics or condition air quality.

Platform 100 can be accessed via cellular WiFi enabling remote administrative access as well as end user access to various service modules (such as the level 2 EV charging service module 400). Remote administrative access can be used to monitor, upgrade and maintain hardware in the power module 300 as well as service modules (such as the level 2 EV charging service module 400). Remote end user access can be granted through internet enabled devices such as a smart phone or automobile application (app) and used to activate service modules (such as the level 2 EV charging service module 400) for public utilization. By giving a user such access, the user can be able to see locations and specific services of all platforms in the network, reserve and request services. They can also be given the opportunity to pay for services online.

During assembly of platform 100, the power bus 320, power panel 322 and necessary internal cabling will be internally affixed to power module 300 in a manner demonstrated in FIG. 2, preferably prior to site assembly. Internally affixing these components can be performed with mechanical fasteners, cable ties, and/or adhesives. Other power module 300 equipment (such as a cellular modem, diagnostic equipment, an onboard computer, etc.) will be affixed internally to power module 300 and plugged into power bus 320 (unpowered during preassembly). Power bus 320 assemblies will be affixed internally to any service modules (such as the level 2 EV charging module 300 as seen in FIG. 4) and any equipment installed in such a service module will be plugged into its power bus 320 (unpowered during preassembly). In this way, the modules are all prepared for stack assembly onsite.

If ground power delivery is being used, it is important to identify the final height of platform 100 and set the length of service mast 314 to that length plus an additional six inches. If using aerial power delivery, refer to local electrical codes for proper length of the aerial service mast 314. Typically this would be 12 feet.

Identify the ground-facing end of service mast 314. Pass service mast 314 through locking plate 506 with the plate side ground-facing. Identify a location for a tap (opening) for power conductive cabling necessary for electrical service meter 405 on service mast 314. This tap should be about 61 inches from the ground-facing end of service mast 314. Tap service mast 314 with a hole suitably sized for 220V service. This tap will be referred to as the meter tap.

Identify a location for a tap for power conductive cabling necessary for kill switch 408 on service mast 314. This tap should be about 50 inches from the ground-facing end of service mast 314. Tap service mast 314 with a hole suitably sized for 220V service. This will be referred to as the kill switch tap.

Run electrical service grade cabling through service mast 314 from the meter tap to the kill switch tap. Run electrical service grade cabling through service mast 314 from kill switch tap through ground-facing end of service mast 314 and threaded service mast receiver into power panel 322. Wire exposed power cabling to kill switch 408 and mount kill switch 408 onto service mast 314 proximate to the kill switch tap. Seal the kill switch tap with water proof sealant. Screw threaded service mast 314 into threaded service mast receiver in power module 300.

Ground power delivery is now described (if applicable). This step assumes previously delivered ground power cabling has been delivered and is exposed in the selected site. Identify a suitable location and mount power module 300. When a suitable location is identified and a mounting option has been selected, assembly of platform 100 can begin. Temporary mounting does not require a method to affix power module 300 to the ground. It simply sits there, held in place by the weight of platform 100. If ground power delivery has been selected, the exposed power line should be fed through threaded ground feed receiver and through threaded service mast receiver to power meter tap and wired to power meter box 410 and then to kill switch 408 and then to power panel 322 in this step. Power meter box should be affixed to service mast 314. Seal the meter tap hole with water proof sealant. Ensure that kill switch 408 is set to arrest power while assembly is being completed.

Aerial power delivery is now described (if applicable). Dead electrical service will be delivered through service mast 314 to power meter tap and pulled through. Exposed power cable is tied to power meter box 410. Affix power meter 405 to meter box 410. Mount meter box 410 proximate to power meter tap. Seal power meter tap hole with water proof sealant. Ensure that kill switch 408 is set to arrest power while assembly is being completed.

Affixing service module(s) to the power module is now described. At this point, power module 300 has been properly installed, affixed, and is in a pre-powered state ready for installation of service modules. Affix the first service module directly to power module 300 by simply placing it atop the power module 300. This will automatically plug the service module power bus 320 into the pre-powered power module 300 power bus 320. Affix any additional service modules as necessary by placing them atop the previously placed service module. Continue this process until all necessary service modules have been placed in a stack. The structure is held in place during assembly by the stacking lips as previously described. The process of stacking modules will affix power bus assemblies to adjacent power bus assemblies to create a 120V/220V power bus system that extends through each module in platform 100, as previously described. Some simple implementations may feature a simple GFI power outlet instead of a stacking power bus (e.g., as described with reference to FIG. 12 below).

Affixing the termination module is now described. The termination module 500 simply rests atop the topmost service module and is held in place by stacking lip forming a receiving receptacle or socket on the underside of the termination module cap 502. Identify the total height of the platform 100 including all modules. Use a length of stabilization mast 306 equal to total height of platform 100 plus 6 inches. Screw stabilization mast 306 into threaded receiver 326 in power module 300. This should leave several inches of exposed stabilization mast atop termination module 500. Press down firmly onto the assembly by pushing downward on the top of the termination module 500. Lock the locking plates 504 and 506 into place. This completes the majority of the assembly of platform 100.

As a final step, energize the platform 100 by turning on power from power provider and deactivate kill switch 408. Platform 100 is now installed and powered.

To use platform 100, an end user registers as an authorized user and selects a method of payment. Users have the ability to select which services across the platform 100 network they wish to have access to. Some services can have a monthly fee associated with them. For example municipal services, internet access, package delivery, and air compression services can have a monthly fee. Some services can have a flat per usage fee. Some services can require users to manually "check out" a service (through an app as previously described) and be charged until the service is manually checked back in (again through the app). Some services will have fees associated with duration of usage or total power delivered (vehicle charging, durable good sharing/rental). Different services will loan themselves to various forms of service subscription at varying rates allowing for varying levels and frequency of utilization. Where applicable, bluetooth enabled devices can be used as unique identifying keys for some services such as electric vehicle charging. Municipal services can be delivered on a bulk basis where certain municipal officials have access to monitor utilization and usage of municipal services at each device location or across the municipal network. Each service can be unique in its implementation, subscription method and service delivery method.

In the case of the level 2 EV charging service module 400, electric vehicle owners would park an electric vehicle at a dedicated parking space near platform 100, open the app to activate charging services, retrieve the plug head and attach it to their vehicle. In some cases users may need to provide an adapter to be able to use the j1772 standard plug head. Users can be charged either per kilowatt hour or per unit of time that their vehicle is charging. When charging is complete, users would unplug the charge head and replace it on the mount or the cable retractor 406 would retract the cable into the cable housing to prevent damage to cable or plug head.

Other implementations of the platform 100 are now described.

In some implementations, an alternate "rack style" technique can be employed. This technique is illustrated using a rack style platform 1000 in FIG. 6 and makes use of substantially similar ground mounting options previously described. However, rack style platform 1000 is shown using four earth spikes 214 that enable the mounting plate 200 to attach to the ground. Typically these spikes are 1 meter in length to decrease the likelihood that a mounting platform would fall down or otherwise be removed unintentionally.

Notably, whereas platform 100 involved stacked service modules to maximize the platform's ability to accommodate an unlimited number of service modules and/or size variations of service modules for future expansion needs, rack style platform 1000 is distinct in that it employs a rack enclosure 1002 with a rack system.

Rack enclosure 1002 can be about 26 inches square and about six feet tall and can be constructed of aluminum, steel or any other durable, environmentally resistant material. Rack enclosure 1002 is substantially environmentally sealed and allows for small penetrations for externally mounted hardware or cabling. Rack enclosure 1002 can be open on one side, preferably the front side 1004, to accommodate installation and usage of rack service modules.

The rack style platform 1000 can be powered via an aerial power feed or a ground feed. An integrated power module 1010 receives and distributes power to the rack service modules. Power can be delivered to the rack service modules via standard power cable runs through the interior of the rack enclosure 1002 or via electrical power sockets 1008 built into the rear of the rack enclosure 1002 electrically connected to the integrated power module 1010. In the latter case, installation of a service module into the rack enclosure 1002 would cause a power receiver of the service module (such as the power receiver 1022 of the rack mount level 2 EV charging service module 1020) to be connected to the energized power socket 1008 and thereby energize the service module. The energized power socket 1008 can be provided in various forms involving a male and female mating receptacle. This can be a typical electrical outlet or any form used in electrical servers or computers.

Rack enclosure 1002 can have multiple mounting rails 1006 that are affixed to the inside of rack enclosure at variable heights and arranged horizontally creating receiving bays allowing for horizontal insertion of service modules substantially similar to the services modules previously described. For example, rack enclosure 1002 can be configured to receive the rack mount level 2 EV charging service module 1020 through the front side 1004 of the rack enclosure 1002 into receiving bays defined by the mounting rails 1006 and secured into place using mechanical fasteners or reliable latches.

One or more blank faceplates 1030 can be affixed to substantially seal any remaining spaces or openings in the front side 1004 against water, pests or particulate penetration.

Figure 6:
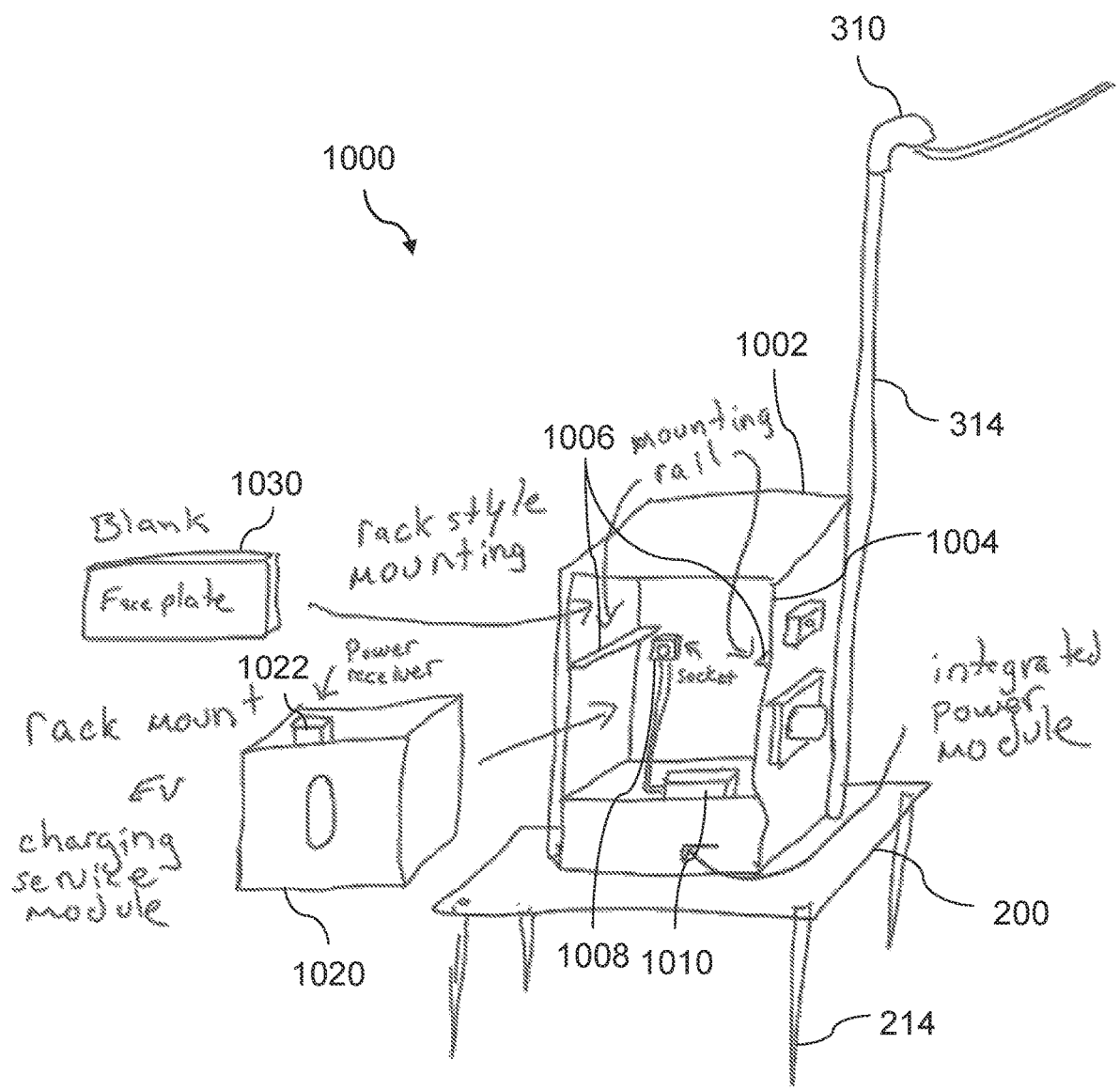
FIG. 6 illustrates a platform in a rack style mounting.
Figure 7A:
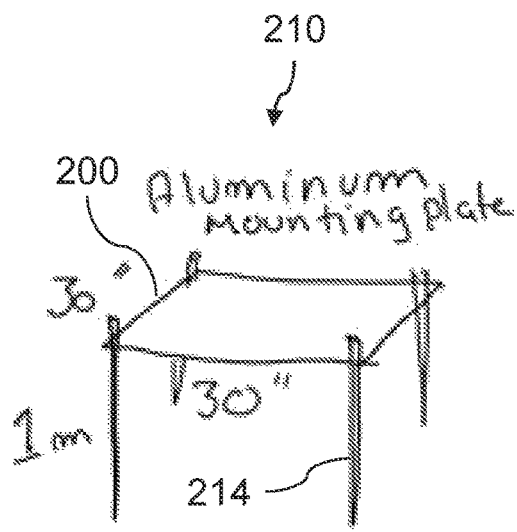
FIGS. 7A-7C illustrate various mounting options.
Figure 7B:
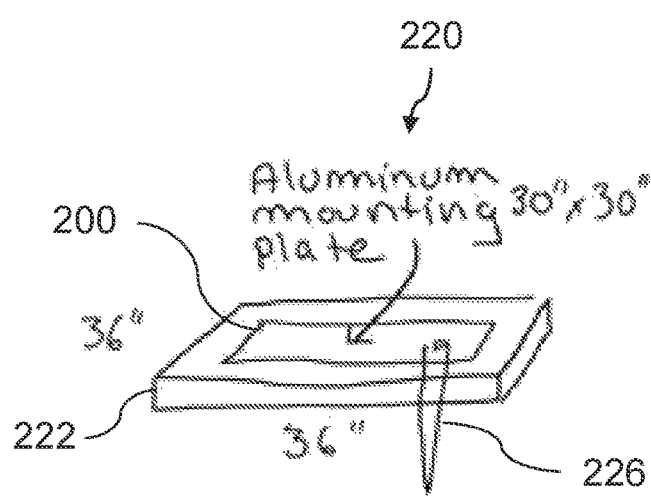
Figure 7C:
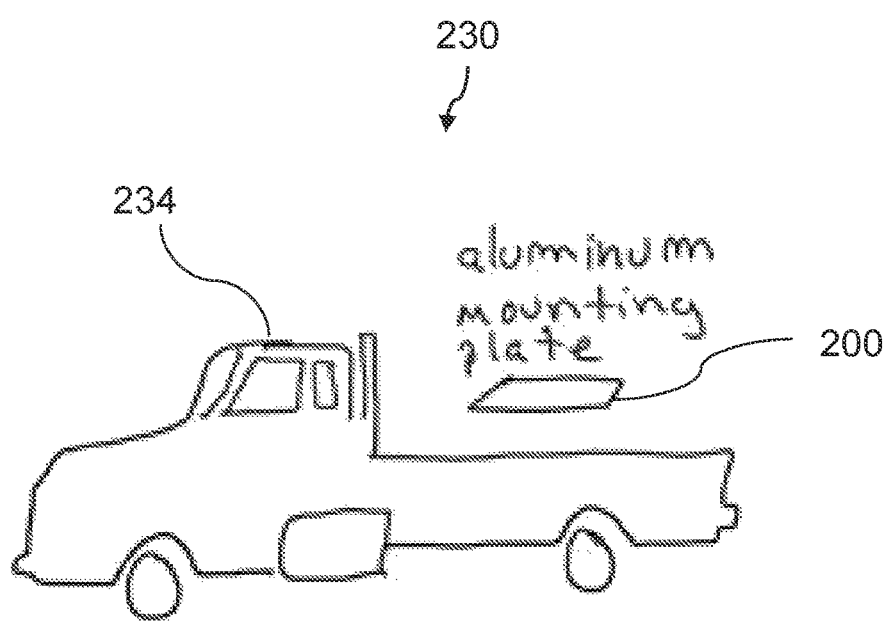

While the platform 100 in FIG. 1 illustrates an assembly in an unmounted confirmation (i.e., mounting plate 200 is not affixed to a ground) and the rack style platform 1000 in FIG. 6 illustrates an mounting plate 200 with ground spikes 214 for a semi-permanent ground mount, other mounting options can also be used. Referring to FIGS. 7A-7C, mounting methods such as a semi-permanent ground mount 210, a permanent concrete pad mount 220, or a mobile plate mount 230 can be used. Any of these mountings can use standard fittings for ease of integration with any combination of power or service options.

As also seen in the rack style platform 1000 in FIG. 6, a semi-permanent mounting option 210 includes four screw type earth anchors 214 of at least 1m in length, each situated at the four opposing corners of the mounting plate to semi-permanently affix a platform. The mounting plate 200 (which is an integrated part of power module 300) is thereby secured to a ground or other fixed structure. Earth anchors can be various sizes and arranged in various positions. The structure and the cumulative weight of the platform 100 will generally be held by these earth anchors 214. The earth anchors 214 can be screws, pilings, stakes, bolts, screws, or any type of mechanical fastener. Earth anchors 214 provide structure security and stabilization as well as electrical grounding for electrical components of a platform. Ground mount 210 can also be used on sand, dirt, wood, concrete, or grass. Preferably one of these earth anchors 214 would be metallic (e.g., copper, aluminum, or steel) to provide a sufficient electric grounding path for the electronics of the platform and the plate 200 would typically be metallic to provide sufficient structural support for a platform. For example, ground mount 210 can be used to temporarily install a platform in a field for emergency response action. Mounting plate 200 can be various sizes, but typically a square geometry with an edge dimension of 30 inches is used. Furthermore, the mounting plate 200 can have openings to accept the earth anchors 214.

Depending on the particulars of site selection, it may be necessary to penetrate surface concrete or asphalt and screw earth anchors through the substrate into the ground beneath. Such earth anchors 226 have holding capacity of 360 lbs to 4500 lbs each depending on the earth substrate in that area. Permanent mounting sets the power module 300 directly into a poured concrete foundation 222 in the selected location. This is illustrated in FIG. 7B, where a permanent mount 220 is used with a platform. The concrete 222 surrounding or encapsulating the mounting plate 200 can be of various sizes, but typically is square with an edge length of 36 inches. Permanent mount 220 can be used when removal of the platform 200 is unlikely or at least not anticipated. While it is envisioned that the permanent mount 220 is permanently located, this is not a requirement, and such a mount can be moved or removed through demolition.

A mobile mount 230 can also be used, as illustrated in FIG. 7C. Mobile mount 230 enables a platform (such as platform 100) to be mounted to a mobile surface, such as vehicle 234 using the mounting plate 200 (which would itself comprise the lowermost part of power module 300). Mechanical fasteners can be used to mount the mounting plate 200 to the vehicle 234. For example, a pick-up truck 234 could allow the platform 100 to be installed in the bed of the truck 234. The platform 100 can be installed inside or outside the vehicle. For example, a cargo van could have a platform installed inside which can be deployed at disaster sites. Additionally, such mobile installations allow platform 100 to be used while driving which can provide services in transit. Mobile vehicles 234 can include anything that moves, whether propelled by an engine or not. For example, cars, trucks, vans, trains, planes, boats, or bikes, or balloons can have platform 100 installed. There is no limitation as to where the platform can be mounted.

Furthermore, while platform 100 is shown in FIG. 1 with the level 2 EV charging service module 400, other service modules can be used. In fact, dozens of service modules can be affixed to platform 100 and shared by everyone in a community.

Figure 8:
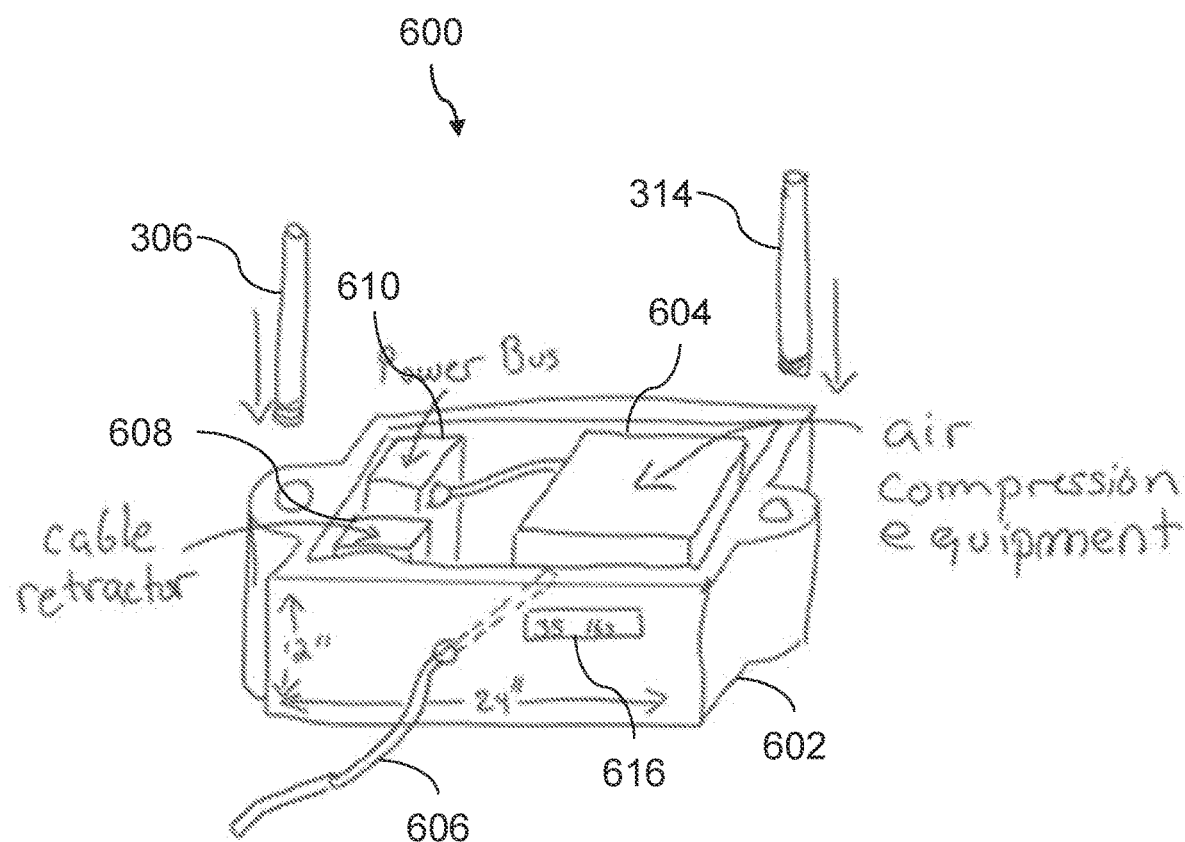
FIG. 8 illustrates an air compression service module.

Referring to FIG. 8, an air compression service module 600 could house pneumatic air compression equipment 604 inside a housing 602. The air compression service module 600 could provide a standard air hose 606 with standard fittings that could be used for any number of purposes such as refilling air in a deflated automobile tire or bicycle tires, basketballs, or operating an automobile air jack. The air hose 606 would be retracted by an automated cable retractor 608 when not in use to prevent damage. A window or display 616 within the chassis 601 would demonstrate the current air pressure for the connected item (tire, ball, jack, etc.). The housing 602 can be about 24 inches square and about 12 inches tall. A power bus 610 is connected to the power bus system of the platform to provide power. This can be a service users subscribe to on a monthly basis.

Figure 9:
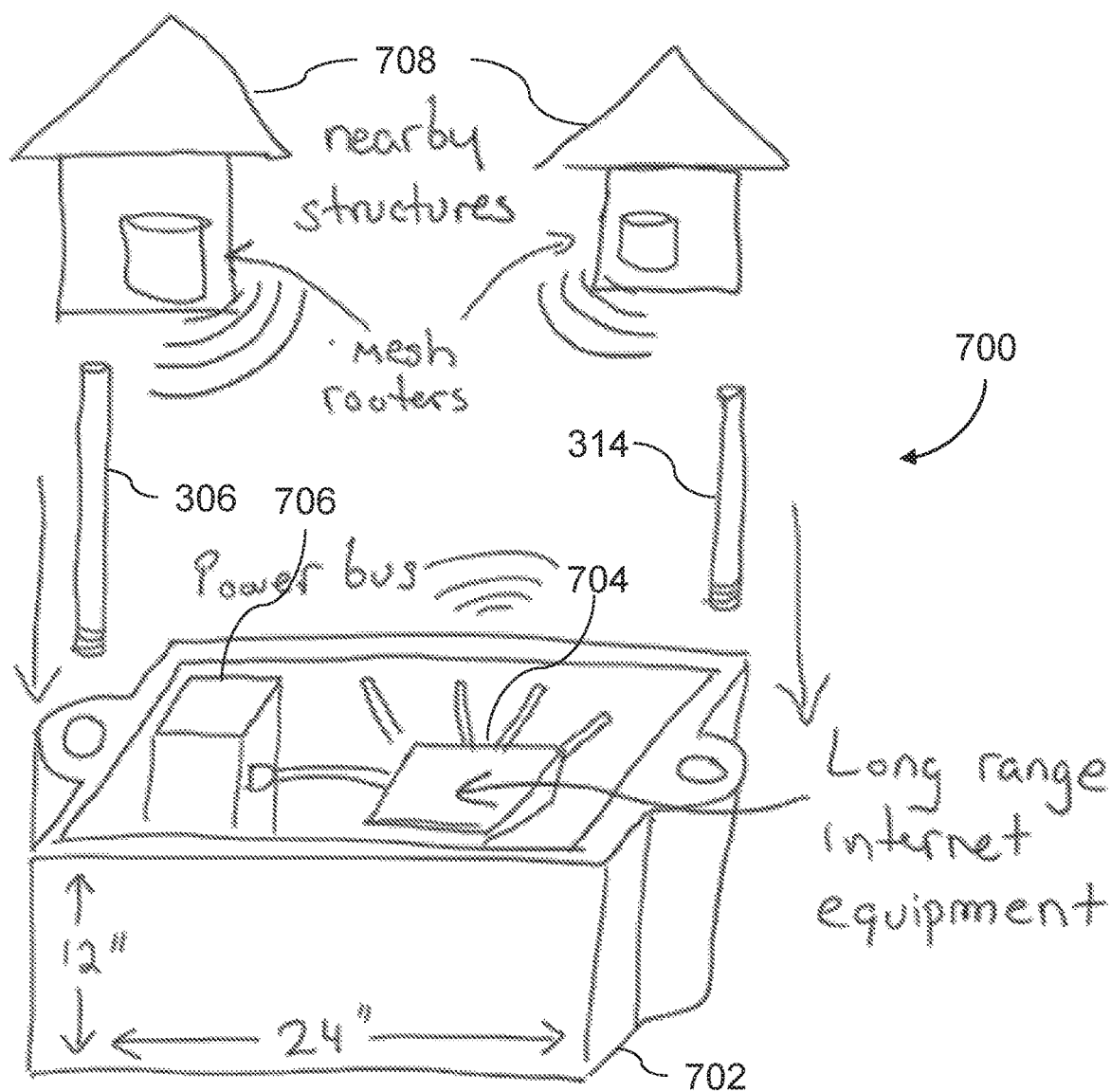
FIG. 9 illustrates a distributed internet service module.

Referring to FIG. 9, a shared residential internet service module 700 can serve internet needs to nearby structures 708, pedestrians on the street, delivery drones, vehicles parked or driving by. The internet service module 700 can preferably make use of commercially available mesh networking technology. Bandwidth over-utilization by individuals can be monitored and commuted through use of commonly available bandwidth limiting features on commercially available tri-band routing equipment 704 using standard operating at 2.4 GHz frequencies or higher. The chassis or housing 702 can be about 24 inches square and about 12 inches tall. A power bus 706 is connected to the power bus system of the platform to provide power. This service would lend itself to a monthly subscription model to anyone with an account on platform 100 network.

Figure 10:
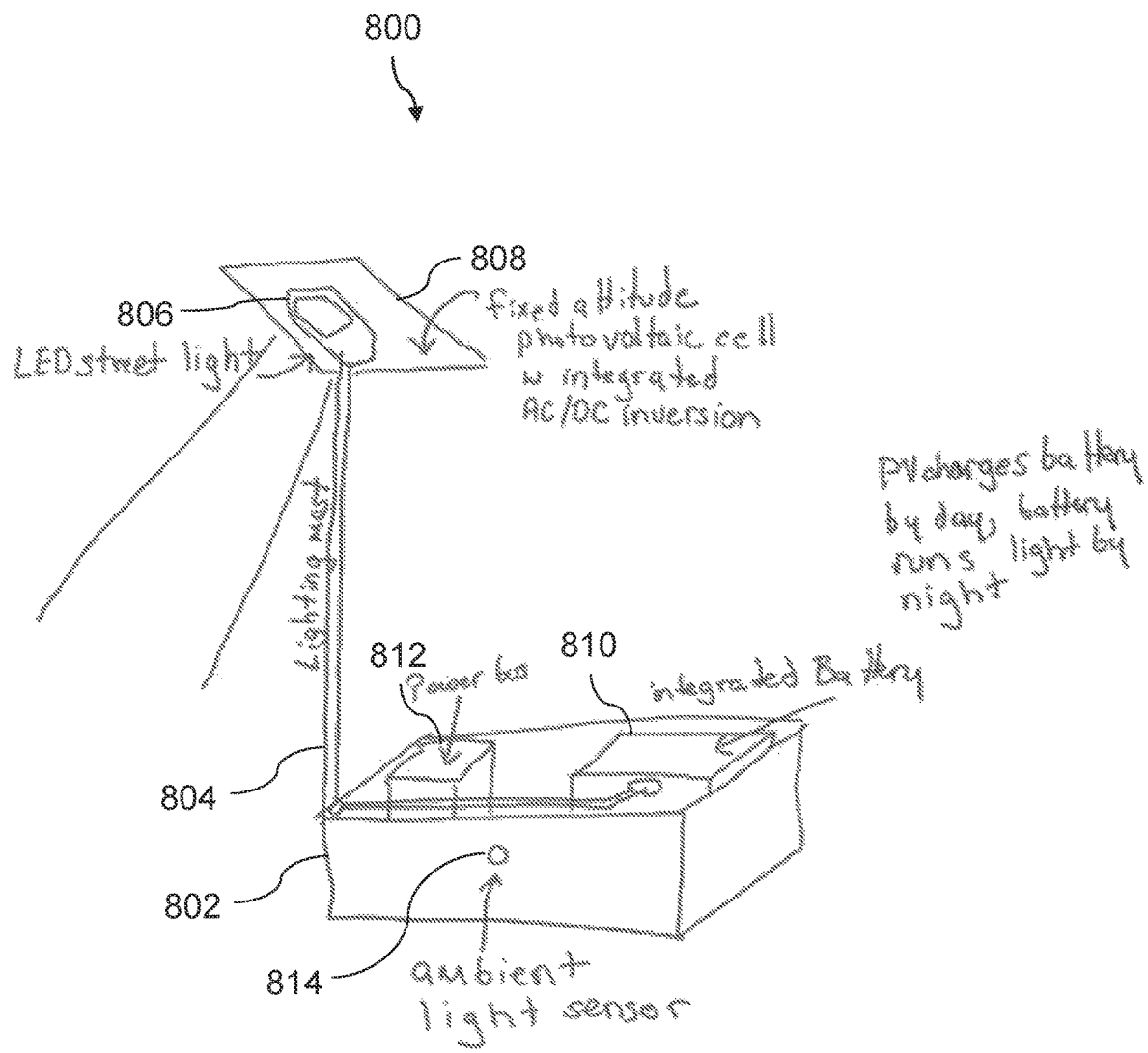
FIG. 10 illustrates a self-powered public lighting service module.

Referring to FIG. 10, an integrated public street lighting service module 800 can in many cases represent a cost savings over traditional unipurpose style street lighting for municipalities wanting to provide least cost lighting solutions without sacrificing quality. Such a street lighting service module 800 can be fabricated with a lighting mast 804 affixed at its bottom end to a housing 802 of the street lighting service module 800. A commercially available 150 W LED style street light 806 and a fixed attitude 425 W photovoltaic panel 808 can be affixed to the top of the lighting mast 804. The street lighting service module 800 can be fitted with an interior mounted rechargeable lithium-ion battery 810 of at least 1.5 kW capacity to store energy collected by the photovoltaic panel 808 during the day time or it can run from exterior connected power.

The street lighting service module 800 can generate its own power from its photovoltaics or run off of grid power provided through power module 300 to the power bus 812 and integrated lithium ion battery 810 and can therefore operate nearly free of cost for thousands of charge cycles of the integrated lithium ion battery 810. The lighting service module 800 can be fitted with an ambient light detector 814 so that it can automatically activate when conditions become dark. Built-in internet access housed in the power module 300 can provide remote monitoring, maintenance and reporting on the usage of the lighting service module 800. The chassis or housing 802 can be about 24 inches square and about 12 inches tall. The street lighting service module 800 can be used as a municipal service subscribed to on a monthly basis per unit by a municipality.

Small device charging service modules can provide standard weather resistant 110V outlets externally mounted the chassis which can be activated through the app and charge a fee for consumed power. Additionally a service module could control an attached inductive charging pad on the ground for ground based electric devices such as a bicycle, scooter, Segway, wheelchair, or similar electric device.

Figure 11:
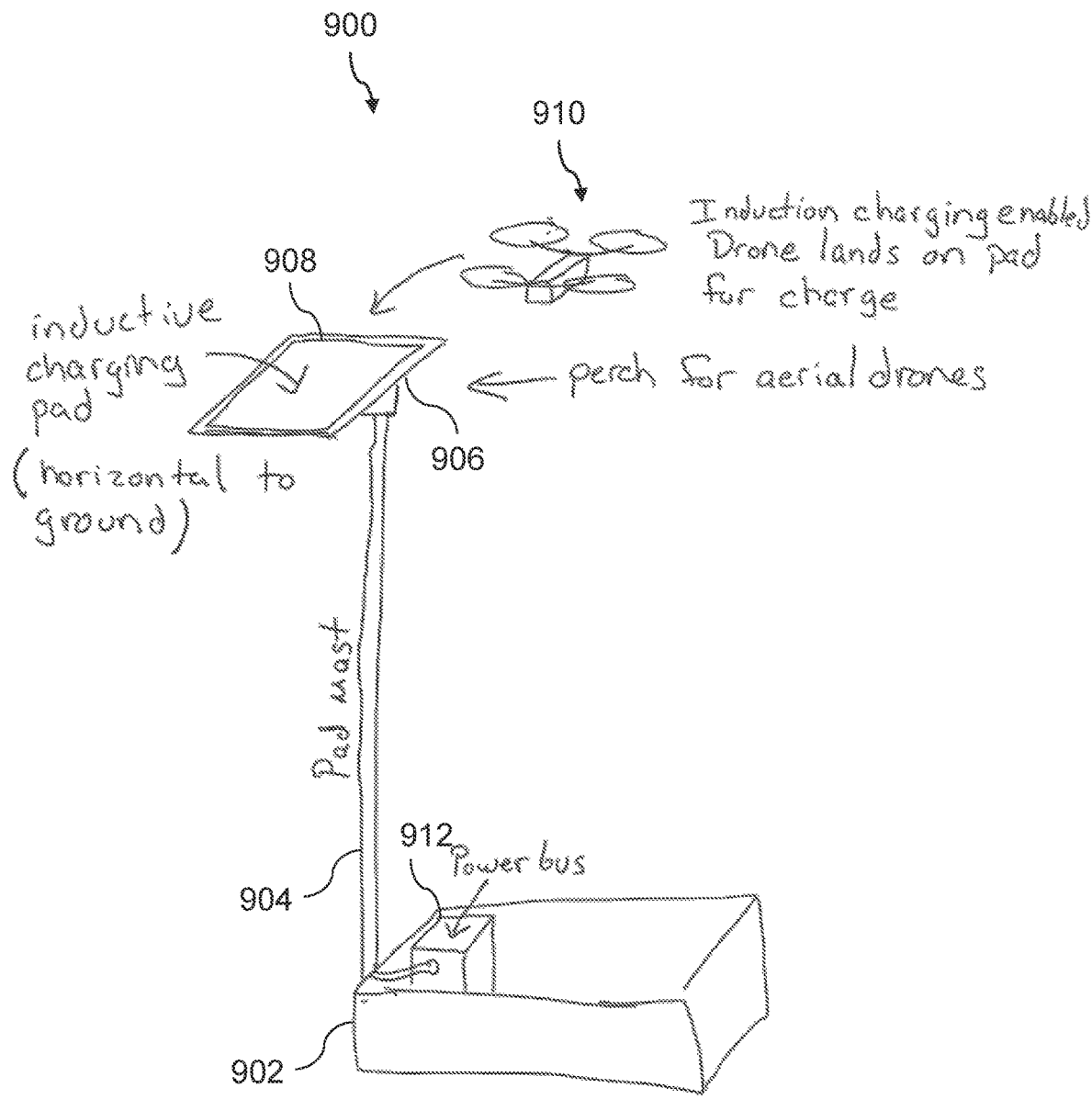
FIG. 11 illustrates a drone charging module.

Referring to FIG. 11, a small device charging service module specifically configured as a drone recharging module 900 could include a boom 904 which extends from a chassis or housing 902 that has a perch or small platform 906 with an inductive charging pad 908 allowing for the recharging of automated aerial delivery drones 910. The chassis or housing 902 can be about 24 inches square and about 12 inches tall. A power bus 912 is connected to the power bus system of the platform to provide power. In operation, aerial delivery drones 910 fly and land, via automated systems or with user control, atop the inductive charging pad 908 which allow the batteries within the aerial delivery drones 910 to be recharged. The perch 906 is preferably horizontal to the ground, but various orientations can be used. Such a drone recharging module 900 can have a monthly fee based on expected utilization and would track individual devices to ensure that the pricing remained consistent with utilization.

Municipal parking control can be effectuated by mounting parking control hardware within a service module along and utilize internet connectivity hardware (if necessary) mounted in power module 300. Such parking control hardware which interfaces directly with parking control data warehouse and can include credit card readers for parking payment. The chassis or housing can be about 24 inches square and about 12 inches tall. While the service unit can charge fees to drivers for parking nearby, fees for this service module can be charged to municipality on a flat per month per unit basis.

Trash and yard waste compaction or incineration can be effectuated by mounting compaction or incineration hardware within a service module featuring an ingress for waste and an exhaust for whatever material remains. The chassis or housing can be about 24 inches square and about 36 inches tall. Subscription to this service can be according to a monthly subscription.

Secure Parcel delivery could be effectuated through fabrication of a service module featuring a large ingress for parcel delivery (by a delivery person or drone for instance) or removal by a person and would log additional and removal of packages through use of an integrated scale to know when various packages were deposited or removed and can feature an internal camera to record deposition and removal events. Such a unit can be fitted with refrigeration or heating components in order to realize secure delivery of certain parcels which can require heating or refrigeration. The chassis or housing can be about 24 inches square and about 24 inches tall. This feature would lend itself to a monthly subscription by end users and can be extremely popular in areas where parcel theft is common.

Public safety service modules can include panic buttons activated by pedestrians in need of emergent assistance which would activate an alarm klaxon and a bright light and it can include static or panning camera/microphone suite providing persistent surveillance of nearby structures, streets, landmarks or intersections in up to a 360 degree field of view of platform 100. Any number of sensors could be mounted to the chassis to activate the camera/microphone suite according to any number of requirements such as time of day, day of week, particularly loud noise levels, or motion activation and footage can be automatically forwarded to a remote address if so desired and subscribed. The chassis or housing can be about 24 inches square and about 12 inches tall. This service would likely be engaged by municipalities and pricing would be dependent on the level of monitoring necessary and the type and frequency of notification desired.

Atmospheric water condensation service modules can be realized by installing electrically cooled coils within a water tight chassis and collecting condensation within a reservoir. The chassis or housing can have an external tap or spigot which dispenses clean water or connects a feed hose to a secondary device such as an external cistern or structure (such as a permanent or temporary building). Excess water will can be ejected from the internal reservoir to prevent damage to the service module components or other components. The chassis or housing can be about 24 inches square and about 12 inches tall. Such a service module can authenticate a user via app and charge by volume for dispensed clean water. Dispensed water can be rationed by the app to ensure egalitarian usage.

Weather monitoring service modules can be fabricated with a customized suite of weather monitoring equipment including barometers, thermometers, anemometers, gauss meters, pyrheliometers, pyronameters and/or rain gauges that collect and transmit weather data via cellular WiFi to local, state or national organizations. This service can be accessed via monthly subscription per platform 100 which collects data.

Durable good sharing service modules can be effectuated by fabricating a subscription governed locker contain portable durable goods such as yard tools, power tools, car jacks or the like. Users can even decide amongst themselves to share their own items. Such a service module can open when an authenticated user accesses the inventory of the locker via the app and opts to check out an included item. The service module can track items added and removed via an integrated scale and it can include an internally mounted camera with a view of the locker door and whomever adds or removes a good and records the footage. The chassis can be about 24 inches square and can be variably tall depending on the class of items users wish to share. This service can be accessed via a flat monthly rate which provides access to a specific service module with a specific inventory of included durable goods.

Cellular service repeating service modules can be used to augment cellular service in specific areas due to weak or distant signal from carrier owned towers. Many municipalities are required to or want to improve cellular service. A service module can be fitted with commercially available cellular repeating hardware such as a femtocell or with carrier specific hardware which retransmits cellular communication in the immediate vicinity directly to cellular towers or to the internet. The chassis or housing can be about 24 inches square and about 12 inches tall for commercially available hardware or taller for carrier specific hardware as necessary. Such a service module would have the effect of improving cellular reception in locations near platform 100. This service module pricing would be via monthly subscription per unit.

Power storage service modules can be fabricated to include energy storage devices such as lithium ion batteries of various storage capacities. The chassis or housing can be about 24 inches square and about 12 inches tall. Power from these batteries can be purchased through externally mounted power outlets to app authenticated users on a per kW basis.

Public vending service modules can be included which provide the means to store consumable or other goods which can be purchased by users and dispensed from the service module though use of the app. The application can track inventory and make inventory information available to users and vendors. Low inventory states can be automatically transmitted to vendor via the internet for stock replenishment. Such a service module can be about 24 inches square and variably tall to support various vended products. The inventory can also be tracked by use of an integrated scale within the chassis which tracks the addition and removal of goods triggered by a change of the total weight of goods within the service module. Such a service module can produce revenue through lease of service module space to vendors whereas fees charged to customers for vended items would then be transmitted to vendor. Alternative to charging vendors leasing fees for space, fees can be charged to vendor as a percent of revenue of vended goods.

HVAC service modules can be included which use internally mounted, commercially available equipment such as a heat pump or air conditioner to heat or cool air. Air intake can occur through a filtered or unfiltered intake air vent on the exterior of the service module feeding into the intake port of the internal equipment. Resulting heated or cooled air ejected from internally mounted device can be dispensed through exposed tube/hose/duct fitting(s) on the exterior of the service module. Such fittings can conform to commonly used HVAC pipe/duct diameters enabling transmission of heated/cooled air via duct/hose a short distance away. Such heated or cooled air can be used for any number of purposes such as heating or cooling an adjacent enclosure like a tent, yurt, automobile, bus stop, tiny home or waiting area or simply blown into the ambient space adjacent to platform 100. Any accumulation of condensation from the air conditioning can be ejected from the service module through a condensation ejection port. Fees for usage could be charged to a validated app user per kW consumed during the heating or cooling event and could stop when the heating or cooling event was terminated by user.

Various power generation service modules can be fabricated and installed which produce power via externally mounted photovoltaic (PV) cells, mast mounted wind turbine(s) or internally mounted gas/diesel generators. Such power can be fed to the local grid or stored locally to a power storage service module for local usage. These service modules can produce revenue by selling generated kW to the local electricity carrier/power company through whatever policy/legal mechanism exists locally to purchase kW from consumers or other power generating entities in that region. The chassis or housing can be about 24 inches square and about 12 inches tall.

In addition, various types of electrical equipment, components, etc. can be employed to provide one or more types of functionality. For example, one or more types of computation devices can be used for control, communications, and other types of functionality within the platform 100.

Figure 12:
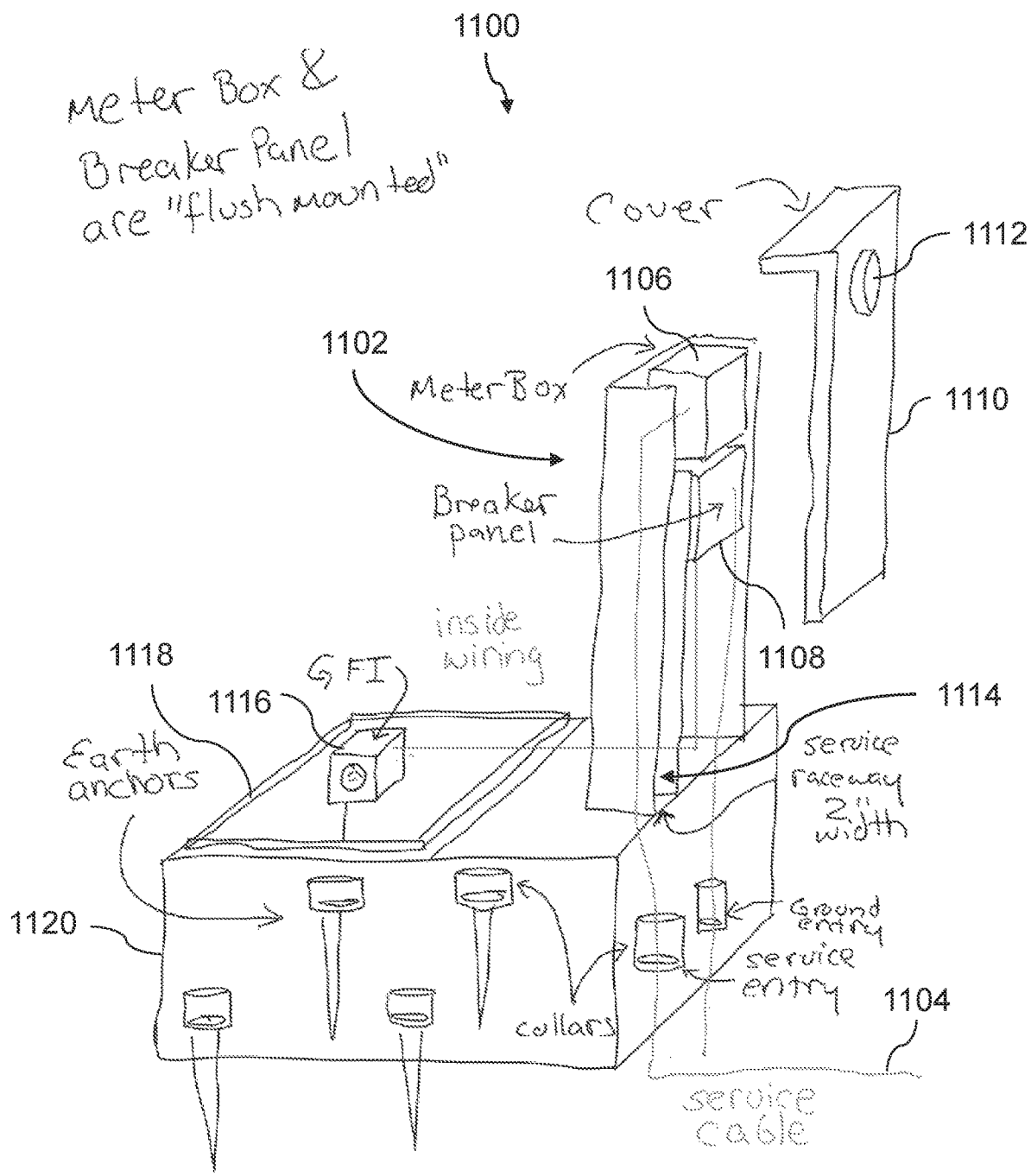
FIG. 12 illustrates an alternate power module.

FIG. 12 illustrates a power module 1100 that is substantially similar to power module 300. However, power module 1100 includes the electrical receipt and power conditioning equipment (e.g., the electrical meter 410) instead of the service module 400. In some implementations, power module 1100 is used with platform 100 described with reference to FIG. 1 above. In power module 1100, the electrical receipt and power conditioning equipment are located within the power module 1100 instead of the service module 400 shown in FIG. 4 to maintain compliance with utility codes and regulations.

Power module 1100 includes a chimney 1102 attached to a housing 1120. The chimney 1102 houses the electrical receipt and power conditioning equipment and provides access to a user. In power module 1100, a service cable enters from the underside of the power module 1100, through a service entry, through a service raceway, and connects to a meter box 1106. The service raceway 1114 has a 2 inch width to accommodate the service cable 1104. The service raceway 1114 separates the service cable 1104 from a breaker panel 1108 and inside wiring for compliance purposes. Similarly, a cable enters through a ground entry on the underside of the power module 1100 and connects to the breaker panel 1108. A cable connects from the breaker panel 1108 to the GFI 1116 (or power bus as illustrated elsewhere) so that other modules can receive electrical power supplied to the power module 1100 via the service cable 1104. The housing 1120 of the power module 1100 includes an opening 1118 so that other modules may be connected on top of the power module 1100 and the opening 1118 is sized large enough to accommodate the necessary cables and wiring from each connected module.

The meter box 1106 and the breaker panel 1108 are flush mounted (e.g., the exterior faces of the meter box 1106 and the breaker panel 1108 are aligned with each other). A cover 1110 is placed adjacent to the meter box 1106 and the breaker panel 1108 so that the meter box 1106 is accessible by a user through an opening 1112 in the cover 1110.

Figure 13:
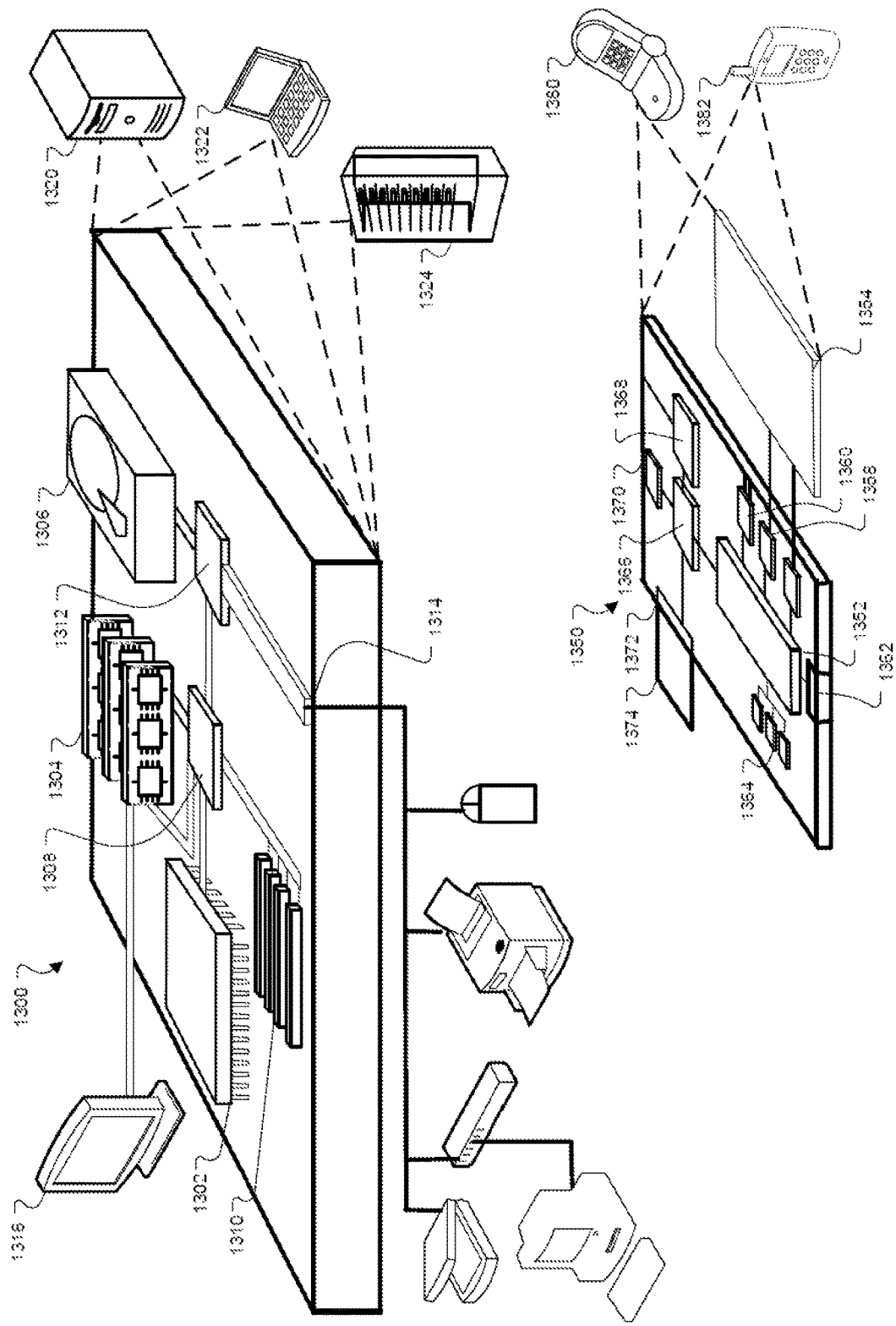
FIG. 13 illustrates an example of a computing device and a mobile computing device that can be used to implement the techniques described here.

FIG. 13 shows an example of example computer device 1300 and example mobile computer device 1350 which can be used to implement the techniques previously described. Computing device 1300 is intended to represent various forms of digital computers, including, e.g., laptops, desktops, workstations, personal digital assistants, servers, blade servers, mainframes, and other appropriate computers. Computing device 1350 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 1300 includes processor 1302, memory 1304, storage device 1306, high-speed interface 1308 connecting to memory 1304 and high-speed expansion ports 1310, and low speed interface 1312 connecting to low speed bus 1314 and storage device 1306. Each of components 1302, 1304, 1306, 1308, 1310, and 1312, are interconnected using various busses, and can be mounted on a common motherboard or in other manners as appropriate. Processor 1302 can process instructions for execution within computing device 1300, including instructions stored in memory 1304 or on storage device 1306 to display graphical data for a GUI on an external input/output device, including, e.g., display 1316 coupled to high speed interface 1308. In other implementations, multiple processors and/or multiple busses can be used, as appropriate, along with multiple memories and types of memory. Also, multiple computing devices 1300 can be connected, with each device providing portions of the necessary operations (e.g., as a server bank, a group of blade servers, or a multi-processor system).

Memory 1304 stores data within computing device 1300. In one implementation, memory 1304 is a volatile memory unit or units. In another implementation, memory 1304 is a non-volatile memory unit or units. Memory 1304 also can be another form of computer-readable medium (e.g., a magnetic or optical disk. Memory 1304 may be non-transitory.)

Storage device 1306 is capable of providing mass storage for computing device 1300. In one implementation, storage device 1306 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 1304, storage device 1306, memory on processor 1302, and the like.)

High-speed controller 1308 manages bandwidth-intensive operations for computing device 1300, while low speed controller 1312 manages lower bandwidth-intensive operations. Such allocation of functions is an example only. In one implementation, high-speed controller 1308 is coupled to memory 1304, display 1316 (e.g., through a graphics processor or accelerator), and to high-speed expansion ports 1310, which can accept various expansion cards (not shown). In the implementation, low-speed controller 1312 is coupled to storage device 1306 and low-speed expansion port 1314. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 1300 can be implemented in a number of different forms, as shown in the FIG. 13. For example, it can be implemented as standard server 1320, or multiple times in a group of such servers. It also can be implemented as part of rack server system 1324. In addition or as an alternative, it can be implemented in a personal computer (e.g., laptop computer 1322.) In some examples, components from computing device 1300 can be combined with other components in a mobile device (not shown), e.g., device 1350. Each of such devices can contain one or more of computing device 1300, 1350, and an entire system can be made up of multiple computing devices 1300, 1350 communicating with each other.

Computing device 1350 includes processor 1352, memory 1364, an input/output device (e.g., display 1354, communication interface 1366, and transceiver 1368) among other components. Device 1350 also can be provided with a storage device, (e.g., a microdrive or other device) to provide additional storage. Each of components 1350, 1352, 1364, 1354, 1366, and 1368, are interconnected using various buses, and several of the components can be mounted on a common motherboard or in other manners as appropriate.

Processor 1352 can execute instructions within computing device 1350, including instructions stored in memory 1364. The processor can be implemented as a chipset of chips that include separate and multiple analog and digital processors. The processor can provide, for example, for coordination of the other components of device 1350, e.g., control of user interfaces, applications run by device 1350, and wireless communication by device 1350.

Processor 1352 can communicate with a user through control interface 1358 and display interface 1356 coupled to display 1354. Display 1354 can be, for example, a TFT LCD (Thin-Film-Transistor Liquid Crystal Display) or an OLED (Organic Light Emitting Diode) display, or other appropriate display technology. Display interface 1356 can comprise appropriate circuitry for driving display 1354 to present graphical and other data to a user. Control interface 1358 can receive commands from a user and convert them for submission to processor 1352. In addition, external interface 1362 can communicate with processor 1342, so as to enable near area communication of device 1350 with other devices. External interface 1362 can provide, for example, for wired communication in some implementations, or for wireless communication in other implementations, and multiple interfaces also can be used.

Memory 1364 stores data within computing device 1350. Memory 1364 can be implemented as one or more of a computer-readable medium or media, a volatile memory unit or units, or a non-volatile memory unit or units. Expansion memory 1374 also can be provided and connected to device 1350 through expansion interface 1372, which can include, for example, a SIMM (Single In Line Memory Module) card interface. Such expansion memory 1374 can provide extra storage space for device 1350, or also can store applications or other data for device 1350. Specifically, expansion memory 1374 can include instructions to carry out or supplement the processes described above, and can include secure data also. Thus, for example, expansion memory 1374 can be provided as a security module for device 1350, and can be programmed with instructions that permit secure use of device 1350. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 1364, expansion memory 1374, and/or memory on processor 1352), which can be received, for example, over transceiver 1368 or external interface 1362.

Device 1350 can communicate wirelessly through communication interface 1366, which can include digital signal processing circuitry where necessary. Communication interface 1366 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 1368. In addition, short-range communication can occur, e.g., using a Bluetooth®, WiFi, or other such transceiver (not shown). In addition, GPS (Global Positioning System) receiver module 1370 can provide additional navigation- and location-related wireless data to device 1350, which can be used as appropriate by applications running on device 1350. Sensors and modules such as cameras, microphones, compasses, accelerators (for orientation sensing), etc. may be included in the device.

Device 1350 also can communicate audibly using audio codec 1360, which can receive spoken data from a user and convert it to usable digital data. Audio codec 1360 can likewise generate audible sound for a user, (e.g., through a speaker in a handset of device 1350.) Such sound can include sound from voice telephone calls, can include recorded sound (e.g., voice messages, music files, and the like) and also can include sound generated by applications operating on device 1350.

Computing device 1350 can be implemented in a number of different forms, as shown in the FIG. 13. For example, it can be implemented as cellular telephone 1380. It also can be implemented as part of smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of systems and methods have been described. Nevertheless, it will be understood that various modifications may be made without departing from the spirit and scope of this disclosure. Accordingly, other implementations are within the scope of the following claims.

What is claimed is:

1. A power distribution platform comprising:
   a power module disposed at the base of the platform and providing power from a power source to a power bus disposed within the power module;
   one or more service modules disposed in the platform and electrically connected to the power bus by an electrical connection;
   a network device configured to provide a network connection between the platform and a remote server,
   a mounting plate comprising mount anchors to affix the power distribution platform in a position;
   a rack system comprising mounting rails to receive the one or more service modules, power module, network device, or controller;
   a power panel configured to provide the power from the power module to the one or more service modules;
   an electrical meter electrically connected to the power source;
   a service cable electrically connected to the one or more service modules; and
   a controller configured to control at least one of: the one or more service modules, the network device, or the power module;
   wherein each of the one or more service modules are vertically stackable above each other within the rack system, and the bottommost one of the one or more service modules is disposed directly above the power module, and
   wherein each of the one or more service modules are enabled by receiving a payment.

2. The power distribution platform of claim 1, wherein the payment is received by a subscription service or on a fee per usage basis.

3. The power distribution platform of claim 1, wherein the payment can be waived if approved according to instructions from the remote server.

4. The power distribution platform of claim 1, wherein the network device is configured to provide data usage information to the remote server.

5. The power distribution platform of claim 1, wherein at least one of the one or more service modules is reservable.

6. The power distribution platform of claim 1, wherein the network device is configured to receive reservation information from the remote server.

7. The power distribution platform of claim 1, wherein each of the one or more service modules are configured to provide a service relating to electric device charging systems, pneumatic systems, internet access systems, lighting systems, sanitary systems, storage systems, public safety systems, water condensation systems, weather monitoring systems, goods sharing systems, cellular service systems, power storage systems, parcel delivery systems, public vending systems, or power generation systems.

8. The power distribution platform of claim 1, wherein one of the one or more service modules is an electric vehicle charging module configured to provide electrical charging service to an electric vehicle, drone, or other vehicle.

9. The power distribution platform of claim 1, where one of the one or more service modules provides between 120V and 250V electrical service at between 10 A and 50 A.

10. The power distribution platform of claim 1, further comprising an electrical kill switch.

11. The power distribution platform of claim 1, wherein the power source is a photovoltaic cell or battery.

12. The power distribution platform of claim 1, wherein the power source is a power grid.

13. The power distribution platform of claim 1, further comprising a termination cap that is configured to cover an opening on the top of the platform.

14. The power distribution platform of claim 1, wherein the power module is configured to generate and/or store electrical power.

15. The power distribution platform of claim 1, wherein at least one of the one or more service modules is a pneumatic air compressor module configured to inflate devices.

16. The power distribution platform of claim 1, wherein at least one of the one or more service modules is a lighting module configured to provide lighting to an area surrounding the platform.

17. The power distribution platform of claim 1, where at least one of the one or more service models is an aerial drone charging station configured to inductively charge aerial drones.

18. The power distribution platform of claim 1, wherein the platform is configured to be mounted and installed on a vehicle.

19. The power distribution platform of claim 1, wherein the service cable is retractable.

20. The power distribution platform of claim 1, further comprising a temperature sensor.

\* \* \* \* \*